April 12, 1955     R. C. STORRIE     2,705,992
DEVICES FOR STRAIGHTENING COTTON PICKER BARS
Filed Nov. 30, 1953     2 Sheets-Sheet 2
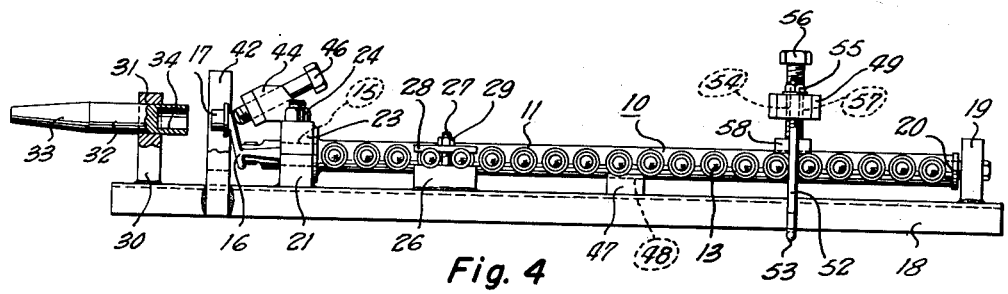
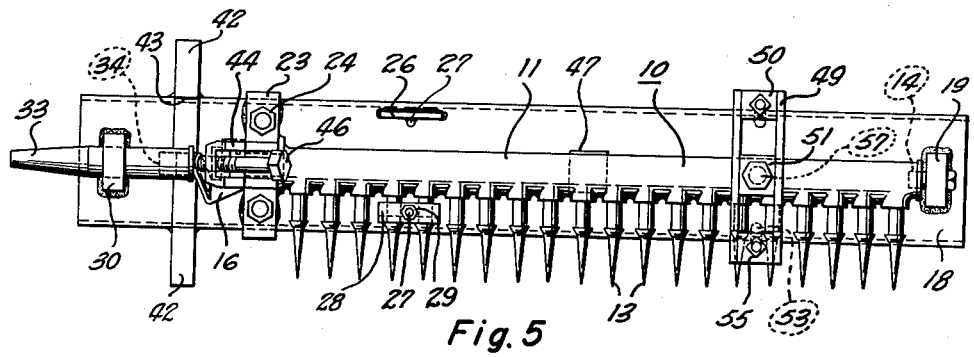
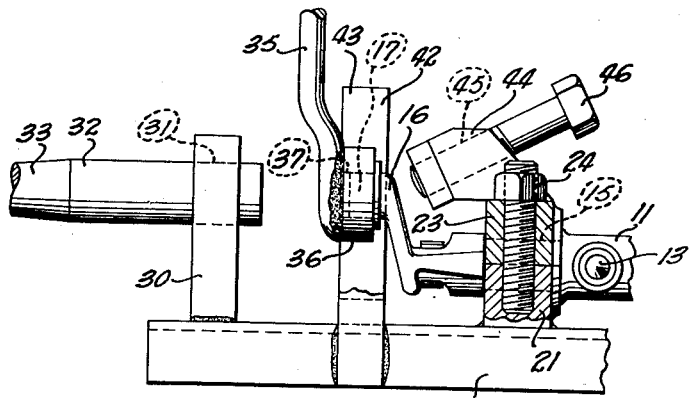
INVENTOR
Robert C. Storrie
BY Shley & Shley
ATTORNEYS United States Patent Office 2,705,992
Patented Apr. 12, 1955

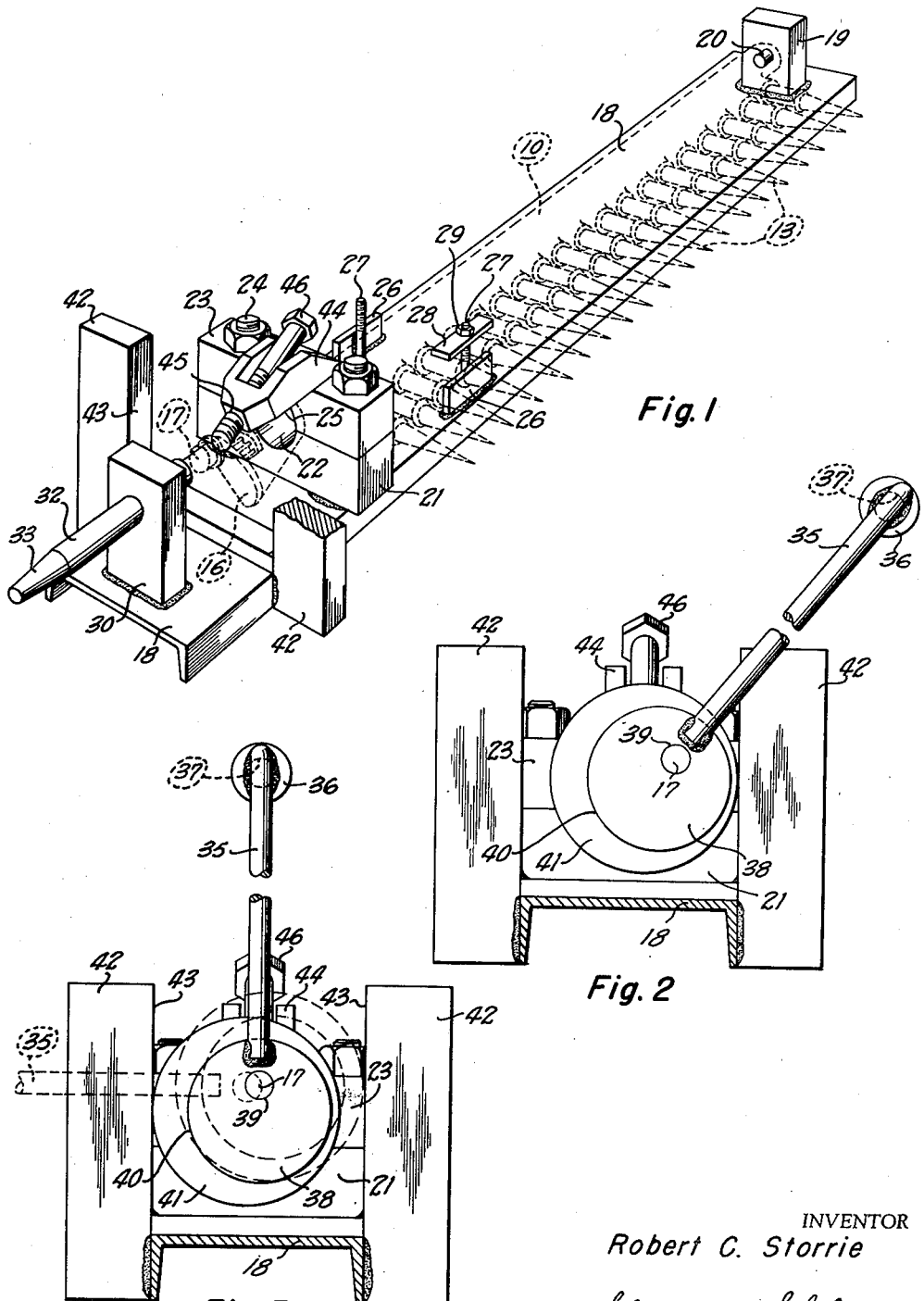

2,705,992

DEVICES FOR STRAIGHTENING COTTON PICKER BARS

Robert Crawford Storrie, Denton, Tex.

Application November 30, 1953, Serial No. 395,166

8 Claims. (Cl. 153—32)

This invention relates to new and useful improvements in devices for straightening cotton picker bars.

In certain types of cotton picking machines, a plurality of cotton picker bars are employed for picking and removing cotton from the standing plant rows. These picker bars have picker fingers or spindles projecting therefrom and are adapted to be rotated in their course of operation in order to bring the picker fingers into proper location with respect to the plant or crop row in order to pick the cotton. Frequently, as the picking machine is being operated, exposed roots or other obstructions may come into contact with the picker bar and cause the same to be bent whereby it does not function properly. Further, the picker bars customarily have an offset or gooseneck arm at their upper end which is utilized for turning the bar to rotate the picker spindles into proper position. When a foreign object enters the machine and interferes with normal operation thereof so as to block or impede movement or rotation of the bars, the offset arms of the bars are often bent, and it is necessary that the arms be straightened and returned to their proper and alined position for most efficient operation of the picking machine.

It is, therefore, one object of this invention to provide a device for straightening cotton picker bars which is simple and rugged in construction, and through the use of which a cotton picker bar may quickly be straightened and realined for proper operation.

A particular object of the invention is to provide a device of the character described into which a cotton picker bar may quickly be secured and wherein the operating arm of the picker bar may very quickly be bent to its normal position by means of a cam type lever.

A still further object of the invention is to provide a device of the character described wherein a cotton picker bar and the arm thereof may be straightened by the application of very little external force.

Still another object of the invention is to provide a device of the character described in which the operating arm of the picker bar may not only be quickly bent to the proper circumferential position with respect to the shank of the picker bar, but also wherein the arm may be bent radially to its properly alined position; and further, wherein, the crank pin customarily present upon the upper end of the picker bar arm may be readily brought into axial parallelism with the axis of the picker bar shank.

Further and more specific objects will be apparent from the following description wherein constructions designed to carry out the invention will be described, together with other features of the invention.

The invention will be more readily understood from a reading of the following specification and by reference to the accompanying drawings, wherein examples of the invention are shown and wherein:

Fig. 1 is a view in perspective of a device for straightening cotton picker bars, the device being constructed in accordance with this invention and being shown with a cotton picker bar appearing therein in dotted lines, Figs. 2 and 3 are transverse, vertical, sectional views illustrating the straightening action of the device, Fig. 4 is a front elevation of the bar straightener, showing the means for straightening the shank of the bar, Fig. 5 is a plan view of the bar straightener, and Fig. 6 is an enlarged, fragmentary, front elevation of the device, partly in section, and showing the use of the crank pin alining means.

In the drawings, the numeral 10 designates a cotton picker bar of the type employed in certain varieties of cotton picking machines. These bars normally are positioned vertically within the cotton picker and are moved therein in a closed path into proximity with the row of cotton plants and out of proximity therewith in order that the picked cotton may be removed and recovered. In general, the picker bars include an elongate shank 11 having a vertical row of picker fingers or spindles 13 projecting therefrom. These fingers 13 are revolved at high speed and carry a multiplicity of small points or teeth upon which the cotton fibers are caught and held.

The picker bars normally are supported within the picking machine upon internal socket bearings 14 provided at their lower ends and upon a reduced neck portion or annular clamp-receiving face 15 at their upper ends which is received and held within a clamping or bearing member (not shown) in the picking machine. An offset or goose-neck arm 16 projects laterally and upwardly from the upper end of each of the shanks 11 and carries upon its upper extremity a crank pin 17 having its axis parallel to the axis of the shank 11 but offset laterally therefrom. Normally, the crank pin 17 lies in a plane displaced 90° from the plane of the picker spindles or fingers 13. In the majority of cases, when these picker bars are damaged or bent in use, there occurs either lengthwise bending of the shank 11, or bending and displacement of the arm 16 circumferentially around the axis of the shank 11 and toward the plane of the spindles 13.

An example of the present invention, adapted for the straightening and realining of damaged picker bars is shown in the drawings and includes an elongate base or supporting member 18 which may be of any suitable or desirable structure, as, for instance, the length of channel steel illustrated. Desirably, the member 18 is rigidly secured to a work bench or other firm support. Adjacent one end of the base 18 there is provided an upstanding support member 19 having a horizontal bearing pin 20 projecting therefrom and extending toward the opposite end of the base member. The socket or internal bearing 14 of the picker bar is received upon the pin 20 for positioning and support of the picker bar on the base member.

Near the opposite end of the base member 18, there is provided a horizontally split supporting member including a lower supporting saddle or saddle block 21 having an arcuate recess 22 which receives the reduced neck 15 of the picker bar. A clamping block 23 is secured upon the saddle 21 by bolts 24 and is provided with an arcuate recess 25 complementary to the recess 22. Thus, means is provided for mounting the picker bar horizontally upon the base member 18 and for holding the bar thereon.

Although the tightening of the bolts 24 to clamp the block 23 to the saddle 21 is effective to hold the picker bar against rotation upon the base member 18, it is desirable that a more positive means for this function be provided, as by the upstanding lugs 26 provided adjacent each edge of the member 18 between the supports 19 and 21. The lugs 26 are of such height as to receive the base portions of the spindles 13 in close proximity to the shank 11 and to support the picker bar upon the member 18 with the spindles 13 projecting laterally and horizontally thereform. As shown, an adjacent pair of the spindles have their base portions engaging the upper edge of the lug 26, and a securing bolt 27, welded or otherwise affixed to the member 18, projects upwardly from the member between this adjacent pair of spindles to receive a clamping bar 28 and nut 29. By tightening the nut upon the bolt 27, the bar 28 is urged into snug engagement with the upper sides of the spindle bases, and hence, the picker bar is held very securely against rotation upon the base member 18.

The picker bars of cotton picking machines are normally made in right and left-hand embodiments in order that the picker spindles thereof may be brought into contact with both sides of a plant or crop row. Since the spindles of a right-hand arm are displaced 180° from the spindles of a left-hand arm, the lugs 26 are provided upon both lateral edges of the base member 18 in order that either a right or left-hand picker bar may be received and clamped into the straightening device.

As shown in Figs. 1 and 4, when the picker bar is clamped into the straightening device, the arm 16 thereof projects upwardly therefrom and curves into a plane parallel to the surface of the base member 18. The crank pin 17 of the arm 16 thus will lie in some plane above the upper surface of the base member 18 and, depending upon the extent to which the picker bar has been damaged, will have its axis more or less parallel to the longitudinal axis of the straightening device. As pointed out hereinbefore, the most likely type of damage is the bending of the arm circumferentially around the axis of the shank 11 toward the plane of the spindles 13. The arm may also be bent in a plane extending through the axis of the shank 11, and the crank pin 17 may be bent or deflected with respect to the arm 16.

For determining the degree of damage to the picker bar arm as well as the type of distortion which has occurred, the straightening device is provided with an upstanding post 30 adjacent the end of the base member opposite that end upon which the supporting member 19 is mounted. The post 30 is provided with a transverse bore 31 through which a gauge member 32 extends parallel to and spaced above the longitudinal axis of the member 18. The gauge member 32 is freely slidable in the bore 31 and includes an elongate cylindrical shank 33 having in its end which faces the picker bar a cylindrical recess 34 of such size as to receive the crank pin 17 snugly. By manually advancing the gauge member 32 through the bore 31 into proximity with the crank pin of the picker bar mounted in the straightening device, it may be observed visually in what manner the arm 16 has been bent or deflected, as well as the extent or degree of bending. When the arm 16 and crank pin 17 are properly positioned and alined upon the picker bar unit 10, the crank pin is received easily in the recess or socket 34 as the gauge member 32 is moved toward the picker bar mounted in the device. Otherwise, further straightening and alinement of the arm and trunnion is necessary. Thus, the gauge member also functions as a means for checking the correctness of the straightening accomplished.

A unique cam action lever is provided for effecting straightening of the picker bar arm and includes an elongate handle 35 carrying upon one extremity a circular collar 36 having an axial bore 37 directed transversely of the handle 35 and of such diameter as to receive the crank pin 17 snugly. Upon the opposite end of the handle 35 there is provided a flat cylindrical stub shaft or central body 38 having its axis at right angles to the longitudinal axis of the handle 35 and being securely connected to said handle. The body 38 is provided with an offset or eccentrically positioned circular opening 39 of such diameter as to receive the crank pin 17, and the axis of this opening is preferably in a common plane with the axis of the handle 35. The outer periphery of the body 38 forms a bearing surface which is rotatably received within the eccentric bore 40 of an eccentric cam or ring 41 which surrounds the body 38. To provide vertical surfaces upon the supporting member 18 which may be engaged by the cam ring 41 of the lever structure, the base member carries a pair of upstanding blocks or fulcrum members 42 disposed between the post 35 and the saddle 21 adjacent the lateral edges of the member 18 and in transverse alinement with the crank pin 17 of the picker bar mounted in the device. As shown, the fulcrum members have lateral surfaces 43 which face the crank pin.

With the picker bar positioned and clamped properly in the straightening device, the crank pin 17 of the picker bar is engaged in the opening 39 of the cam action lever. With a right-hand picker bar positioned in the device, as shown in the drawings and with the arm 16 improperly bent toward the spindles 13 as shown in Fig. 2, the handle 35 of the lever structure is then swung in the direction necessary to return the arm and crank pin to their proper positions, as shown in Fig. 3. Because of the eccentric positioning of the opening 39 with respect to the outer periphery of the ring 41, this swinging action causes the periphery of the ring to bear against the right-hand fulcrum member 42, as viewed in Figs. 2 and 3 and hence results in the opening 39, along with the crank pin 17, being forced to the left into its proper position wherein it is displaced 90° from the plane of the spindles 13.

It has been found desirable in straightening these arms, to bend them a little past the point of alinement, and then to bend them slightly in the opposite direction to bring them precisely into alinement and to eliminate residual stresses present in the arm 16 and resulting from the bending or straightening action. It is for this reason that the eccentric outer ring 41 is provided. As the straightening lever is positioned upon the crank pin 17, it is desirable to revolve the ring 41 upon the body 38 until the thinnest portion of the ring faces the fulcrum member 42 which is to be engaged by said ring. Then, as the handle 35 is swung and the arm 16 is moved toward and past its proper position of alinement as shown in dotted lines in Fig. 3, the opposite and thickest side of the ring 41 will be in position for engagement with the inner face 43 of the opposite fulcrum member 42. Then, by a simple return of the handle 35 toward a vertical position, as shown in full lines in Fig. 3, the reverse bending or flexing of the arm 16 is accomplished without requiring excessive swinging of the handle 35 or re-positioning of the cam ring 41. In this manner, the straightening may be achieved by a simple swinging movement of the straightening lever and its handle 35 and with the application of very moderate force thereto.

It sometimes happens that the crank pin 17 is bent with respect to the arm 16 so that the axis of the crank pin is not parallel to the axis of the shank 11 even though the arm 16 has been returned to its proper position. This eventuality is taken care of by the provision of the collar 36 upon the handle 35, the collar readily being engageable over the crank pin, as shown in Fig. 6, whereby the crank pin may be bent to its proper alined position by simple movement of the handle 35 in the necessary direction.

It also sometimes occurs that the arm 16 is not only bent or distorted radially around the axis of the shank 11, but also is bent outwardly with respect to the shank whereby the distance between the axes of the crank pin 17 and the shank 11 is too great. To provide for proper straightening of the arm 16 in such an eventuality, there is provided upon the upper surface of the retaining block 23 an angular bracket 44 having a screw-threaded opening 45 directed toward the arm 16. A screw-threaded bolt 46 is received in the opening 45, and as the bolt is rotated therein it is moved into engagement with the arm 16. Obviously, further rotation or tightening of the bolt 46 will force the arm 16 to bend into its properly alined position. Further, when the crank pin 17 is being straightened upon the arm 16 by means of the collar 36, it is often desirable to screw the bolt 46 into engagement with the arm to insure the bending of the crank pin upon the arm rather than the bending of the entire arm.

In the event the shank 11 of the picker bar 10 is bent laterally intermediate its ends, the picker bar is clamped into the straightening device with the bend or bow of the shank projecting upwardly. There is then inserted between the shank of the picker bar and the upper surface of the base member 18 a suitable wedge or supporting block 47 having an arcuate recess 48 in its upper surface within which the shank is received. Desirably, the block 47 is positioned between the high point of the bend and the saddle 21 or the support 19, whichever is closer to the bend, and is spaced from the high point a distance substantially equal to the distance between said high point and that end of the shank to which the bend is nearer.

There is then placed transversely over the high point of the bend a straightening member which includes a pair of spaced parallel bars 49 joined at their ends by blocks 50 and carrying therebetween a medial block 51. J-bolts 52 have their hooks 53 engaged beneath the lateral edges of the member 18 and extend upwardly through openings 54 in the blocks 50. Nuts 55 may be screwed down upon the J-bolts as necessary to position the straightening member above the shank 11 of the picker bar.

A screw-threaded bolt or rod 56 extends vertically through a screw-threaded opening 57 in the medial block 51, and there is provided upon the lower end of the rod a follower or saddle 58. Manifestly, as the rod is rotated and screwed downwardly through the opening 57, the saddle 58 is forced against the high point of the bend in the picker bar shank, and the straightening of the shank necessarily results.

The device herein described has proven very effective in the quick and positive straightening of the shanks and arms of cotton picker bars, and the device readily lends itself to faultless operation by unskilled persons. Provision is made for carrying out the various types of straightening operations which are encountered, as well as providing positive checking of the correctness of the straightening accomplished.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A device for straightening cotton picking machine picker bars of the type having a spindle-carrying shank and an offset arm projecting from one end of the shank with a crank pin on the end of the arm, said device including, a supporting member, means for securing a picker bar on the supporting member and holding the picker bar thereon against longitudinal and rotational movement including means to engage said picker bar adjacent said offset arm to rigidly hold the same against displacement, elements projecting from the supporting member on each side of the picker bar crank pin, and a cam lever including a body with an eccentric opening therein receiving the picker bar arm crank pin and a handle projecting laterally from the body, the body having an arcuate periphery, the projecting elements having surfaces engaged by the arcuate periphery of the body.

2. A device for straightening cotton picking machine picker bars of the type having a spindle-carrying shank and an offset arm projecting from one end of the shank with a crank pin on the end of the arm, said device including, a supporting member, means for securing a picker bar on the supporting member and holding the picker bar thereon against longitudinal and rotational movement including means to engage said picker bar adjacent said offset arm to rigidly hold the same against displacement, elements projecting from the supporting member on each side of the picker bar crank pin, and a cam lever for straightening the picker bar arm, the lever including a circular central body with an eccentric opening therein receiving the picker bar arm crank pin and a handle projecting laterally from the central body, an arcuate cam ring rotatably mounted on the periphery of the central body, the projecting elements having surfaces engaged by the periphery of the cam ring and spaced apart a distance less than twice the greatest distance between the center of the eccentric opening in the central body and the periphery of the cam ring.

3. A device as set forth in claim 2 wherein the axis of the eccentric opening in the central body lies in a common plane with the longitudinal axis of the handle, and the periphery of the cam ring is eccentric with respect to the central body.

4. A device for straightening cotton picking machine picker bars of the type having an elongate spindle-carrying shank with bearing means at its lower end and an annular clamp-receiving face at its upper end, the shank having an offset arm projecting from its upper end with a crank pin on the end of the arm, said device including, a supporting member having means for engaging the bearing means of the picker bar shank and rigidly supporting the lower end of the shank, a saddle block on the supporting member engaging the clamp-receiving face of the shank, a clamping block overlying the saddle block and removably secured thereto for clamping the shank to the saddle block, a lug projecting from the supporting member and engaging the picker bar for holding the latter against rotation, means for securing the picker bar to the lug, a pair of fulcrum members projecting from the supporting member in substantial transverse alinement with the position occupied by the picker bar arm crank pin, and an arm-straightening lever having a body with an arcuate periphery received between the fulcrum members, the body having a handle projecting laterally therefrom and an eccentrically-positioned opening transverse to the handle for receiving the picker bar crank pin.

5. A device as set forth in claim 4 wherein the fulcrum members are spaced apart a distance less than twice the greatest distance from the center of the eccentric opening of the body to a point on the periphery of said body.

6. A device as set forth in claim 4, and a crank pin alinement gauge for engaging the picker bar crank pin axially, the gauge being movably mounted on the supporting member for longitudinal movement into engagement with the crank pin.

7. A device as set forth in claim 4, and a screw-threaded rod carried by the clamping block in a screw-threaded bore facing angularly downwardly toward the picker bar arm.

8. A device as set forth in claim 4, and a straightening bar removably connected to the supporting member and extending transversely of the picker bar shank outwardly thereof from the supporting member, the straightening bar carrying a screw-threaded rod in a screw-threaded bore directed toward the picker bar shank.

References Cited in the file of this patent

UNITED STATES PATENTS

| Number | Name | Date |
|---|---|---|
| 749,816 | Granger | Jan. 19, 1904 |
| 844,551 | Turner | Feb. 19, 1907 |
| 1,308,501 | Littell | July 1, 1919 |
| 1,605,310 | Weaver | Nov. 2, 1926 |
| 1,879,979 | Countryman | Sept. 27, 1932 |
| 2,310,151 | Pope | Feb. 2, 1943 |
| 2,635,668 | Redinbaugh | Apr. 21, 1953 |
| 2,635,669 | Worthington | Apr. 21, 1953 |